UNITED STATES PATENT OFFICE.

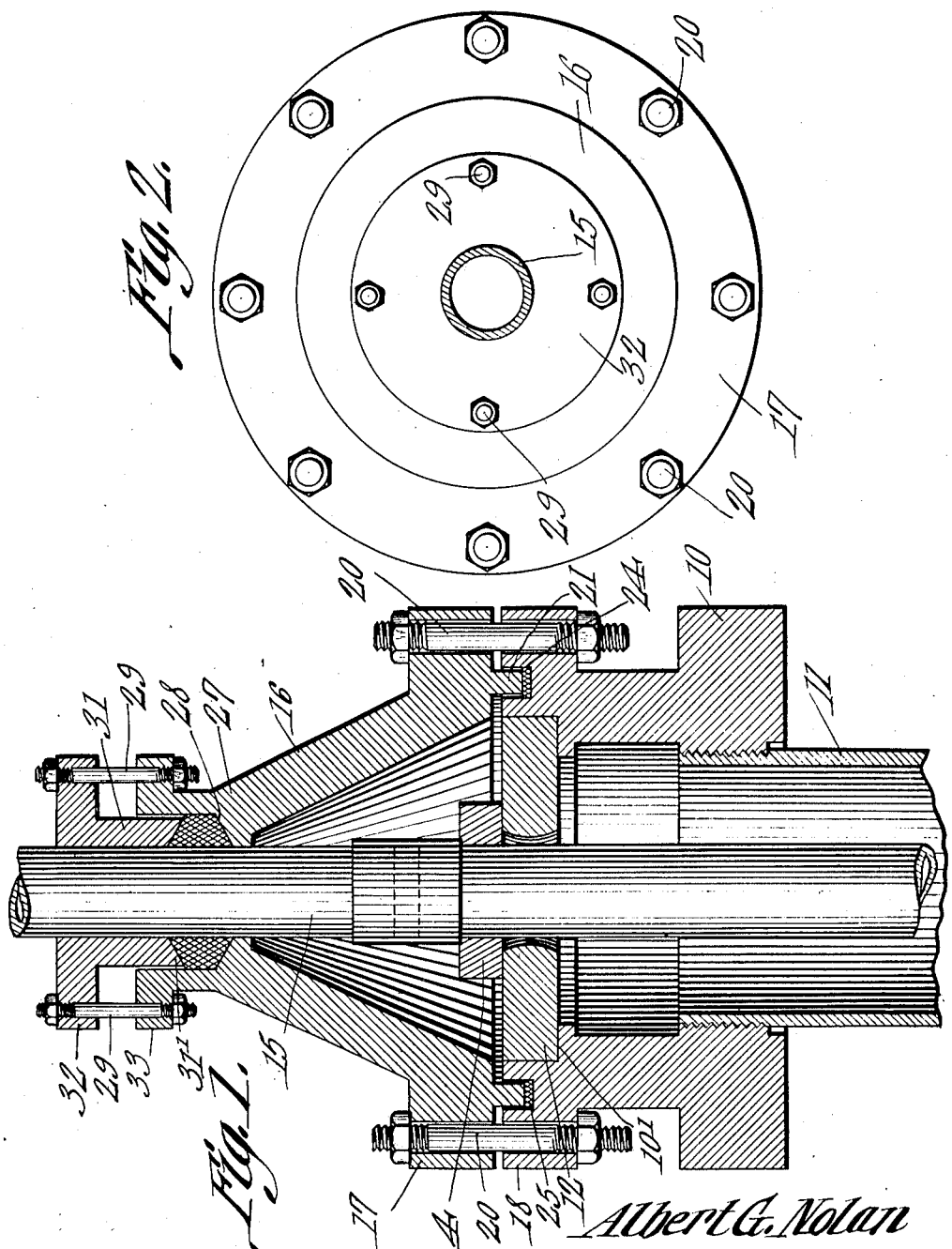

ALBERT G. NOLAN, OF CAMDEN, WEST VIRGINIA.

CASING-HEAD FOR OIL AND GAS WELLS.

1,035,630. Specification of Letters Patent. Patented Aug. 13, 1912.

Application filed January 9, 1912. Serial No. 670,273.

*To all whom it may concern:*

Be it known that I, ALBERT G. NOLAN, a citizen of the United States, residing at Camden, in the county of Lewis and State of West Virginia, have invented a new and useful Casing-Head for Oil and Gas Wells, of which the following is a specification.

This invention relates to casing heads for gas wells.

The primary object of the invention is to provide a head construction which will prevent the escape of oil and gas and at the same time prevent the tube from falling within the well.

In the drawings, Figure 1 is a vertical section. Fig. 2 is a top plan view.

In the drawings, 10 designates the casing coupling into which the casing 11 is screwed. The coupling 10 is provided with a shoulder 10' upon which the casing ring 12 seats itself, the tube ring 14 resting upon said casing ring and surrounding the tube 15. The conical hood 16 is formed with the annular flange 17 which overhangs the flange 18 of the coupling 10, said flange 17 being provided with openings through which the bolts 20 pass. The member 16 is formed with the annular rim 21 which registers with the annular recess 24 formed in the coupling, this recess being filled with packing 25. It will be noted that as the bolts 20 are tightened the rim and packing will form an oil and gas tight connection between the hood and coupling. The hood terminates in the tubular reduced portion 27 which surrounds the tube 15, the tubular extension being provided with a double diameter bore, the walls 28 of the bore being tapered. The gland 31 extends within the larger bore, the tapered end portion 31' coacting with the tapered wall 28 to force the packing against the tubing 15. The gland 31 is formed with the flange 32 which corresponds with flange 33 of the tubular extension of the hood. These flanges are bolted together and are adjusted to force the packing 25 in contact with the tube to prevent the escape of oil and gas. It will be noted that this construction provides an oil and gas tight joint between the casing and the tube, preventing the oil and gas from passing around the tube and escaping.

What is claimed is:—

1. A casing head for oil wells, consisting of a coupling, a conical hood secured to said coupling, said coupling being formed with an interiorly disposed shoulder, a casing ring resting upon said shoulder and a tube ring supported by said casing ring.

2. A casing head for oil wells, consisting of a coupling, said coupling being formed with an interiorly disposed shoulder, a casing ring supported by said shoulder, a tube ring supported by said casing ring, a conical hood supported by said coupling, said hood being formed with a cylindrical extension provided with a contracted neck adapted to contact with the well tube and a gland adjustably supported with said cylindrical extension.

3. A casing head for oil wells, consisting of a coupling, a casing ring supported by said coupling, a tube ring supported by said casing ring, a conical hood, said hood being formed with a rib arranged to extend within a groove in the coupling, said coupling and hood being formed with apertured flanges, said hood being formed with a contracted neck which surrounds the well tube.

In testimony that I claim the foregoing as my own, I have hereto affixed my signature in the presence of two witnesses.

ALBERT G. NOLAN.

Witnesses:
J. B. COPLEY,
C. D. CAIN.